UNITED STATES PATENT OFFICE.

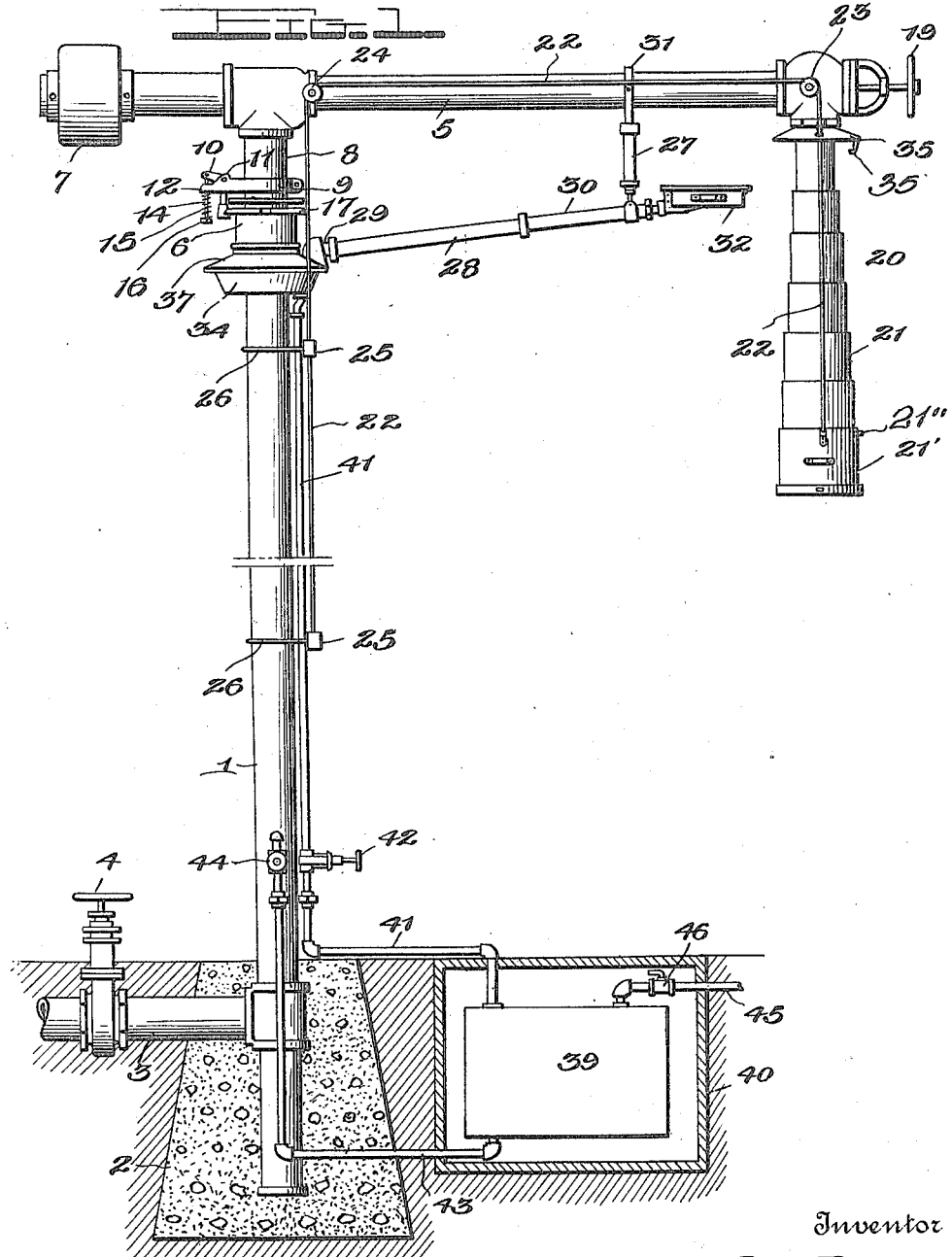

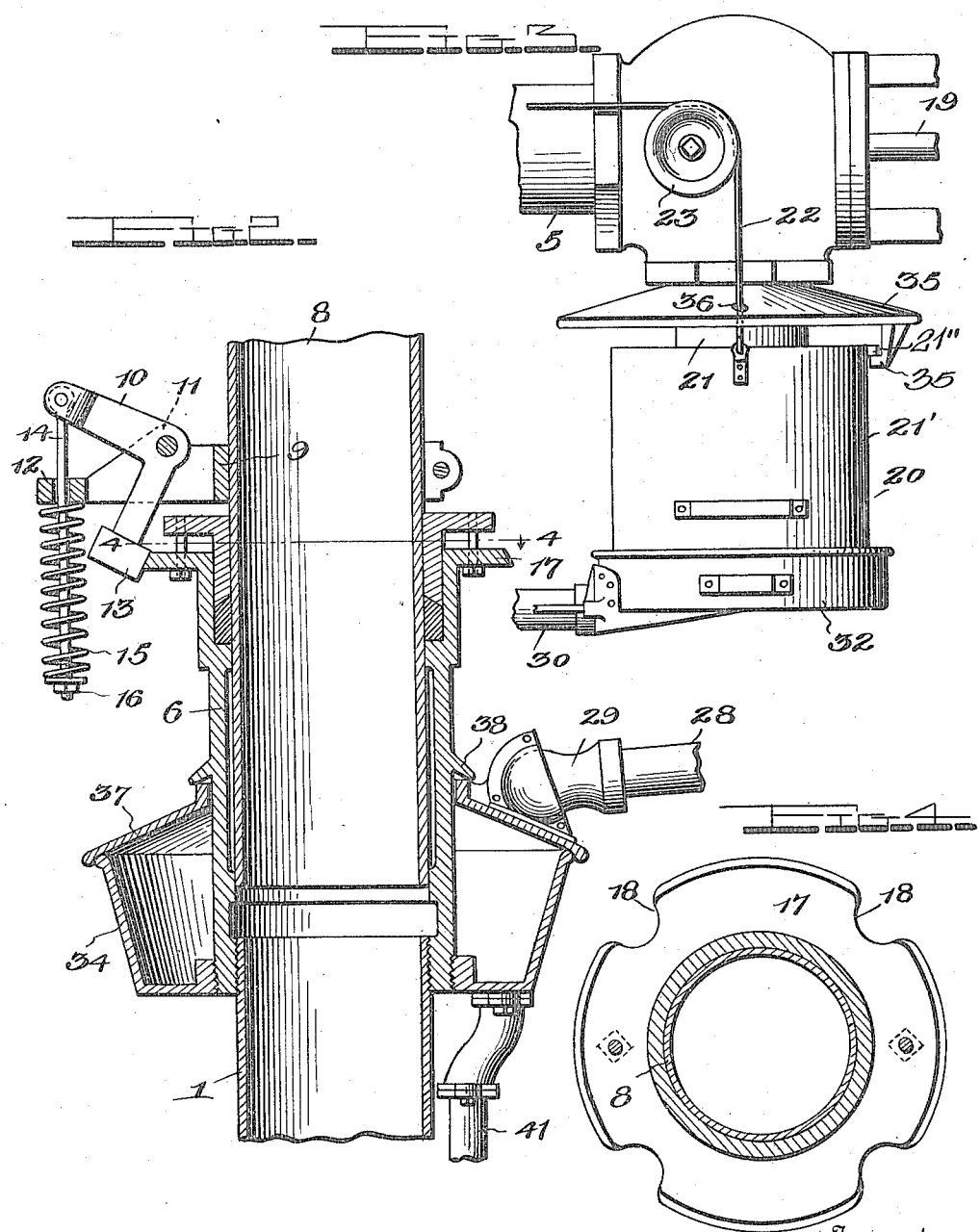

WESLEY M. ROSE, OF SACRAMENTO, CALIFORNIA.

STAND-PIPE.

1,180,543. Specification of Letters Patent. Patented Apr. 25, 1916.

Application filed September 16, 1915. Serial No. 51,052.

*To all whom it may concern:*

Be it known that I, WESLEY M. ROSE, a citizen of the United States, residing at Sacramento, in the county of Sacramento and State of California, have invented certain new and useful Improvements in Stand-Pipes; and I do declare the following to be a full, clear, and exact description of the invention, such as will enable others skilled in the art to which it appertains to make and use the same.

This invention relates to improvements in stand pipes and more particularly to oil columns for delivering fuel or other oil to locomotives, cars, wagons, and the like, and is designed as an improvement over the structure in my Patent, No. 874,246, dated December 17, 1907.

The object of the invention is to provide a combination sump cover and rotatable drip pipe support for stand pipes whereby the swinging spout will be relieved from much of the weight of said drip pipe.

With these and other objects in view, the invention consists of certain novel features of construction, and the combination and arrangement of parts as will be more particularly described and claimed.

In the accompanying drawings: Figure 1 represents a side elevation of a stand pipe embodying this invention; Fig. 2 is an enlarged vertical section through the upper portion of the stand pipe; Fig. 3 is an enlarged side elevation of the nozzle carrying end of the delivery pipe showing the expansible nozzle in collapsed position with the drip pan in position thereunder; Fig. 4 is a transverse section taken on the line 4—4 of Fig. 2.

In the embodiment illustrated, a vertical stand pipe member 1 is shown embedded for support in a concrete block 2, the lower end of said pipe being connected to the pipe line 3 which is equipped with a valve 4 for controlling the flow of oil or other fluid through the pipe.

A horizontally disposed delivery pipe 5 is revolubly mounted in a packing box 6 on the vertical member 1 and is provided with a counter-balancing weight 7 to assist in operating said pipe. The delivery pipe 5 as shown has a depending coupling member 8 which is inserted and turns in the packing box 6 and on which is mounted a collar 9 secured by any suitable means and having a spring pressed catch member 10 mounted therein, said collar being here shown provided with oppositely disposed apertured lugs 11 projecting from the upper edge thereof and in which said catch member 10 is pivoted. This collar is also provided in advance of said apertured lugs 11 with an apertured ear 12, the aperture therein extending in a plane at right angles to the apertures in the lugs 11, that is to say, in a vertical plane, for a purpose to be described. The catch member 10 is here shown in the form of a bell crank lever, the free end of one arm of which has a round head 13 for a purpose to be described. A rod 14 is pivotally connected at one end with the other end of said bell crank and extends through the aperture in the ear 12 and has mounted thereon below said ear, a coil spring 15 which is held in position by means of a nut 16 on the lower end of said rod, said spring being in the form of an expansion spring and exerts its tension to produce a downward pull on the lever arm with which it is connected and thereby causes the other arm of said lever to move inwardly toward the stand 1 for a purpose to be described.

An annular flange or plate 17 encircles the packing box 6 and has a fixed connection with the stand 1. This annular plate or flange 17 has a beveled peripheral edge provided with a plurality of spaced recesses 18, four of which are here shown arranged at diametrically opposite points, although obviously any desired number may be employed. These recesses 18 are curved to provide for the reception of the round head 13 of the catch member 10 which is designed to enter these recesses for locking the delivery pipe 5 against turning as will be hereinafter more fully described.

The outer end of the delivery pipe 5 is provided with a control valve 19 from which depends a nozzle 20 composed of a series of telescopic sections 21 as clearly shown in Fig. 1. Any desired number of these sections 21 may be employed according to the length which it is desired to extend the nozzle and said nozzle is here shown with its lowermost section 21′ connected with counter-balancing cords as 22 which are arranged on diametrically opposite sides of the nozzle and stand, one only being here shown but it is to be understood that a corresponding cord is arranged at the opposite side of the apparatus. This cord 22 which may be of wire or other suitable material is connected at one end to the lower section 21' and passes over a pulley 23 mounted on one side of the free end of the delivery pipe 5 and thence passes along said pipe and downwardly over another pulley 24 mounted on the coupling 8 which connects the pipe 5 with the stand. This cord then passes downwardly and is secured to a weight 25 which is carried by a guide 26 slidably encircling the stand 1. These weights and cords on the telescopic nozzle adapt it to be more readily and easily handled by the operator and assist the spring 27 which supports the drip pan on said delivery pipe as will be hereinafter more fully described.

A waste or drip pipe 28 composed of telescopic sections 29 and 30 is suspended from the horizontal delivery pipe 5 by means of a rigid bracket 31 and a spring support 27, the spring support 27 being secured to the member 30 of the drip or waste pipe.

The outer end of the pipe section 30 carries a pan 32 which is adapted, under the influence of the spring support 27, to have a fluid tight engagement with the lower section 21' of the nozzle 20 when said nozzle is in collapsed position as shown in Fig. 3, and the waste from the nozzle is prevented from falling to the ground and becoming lost, said waste being conducted from said pan through the waste pipe sections 29 and 30 whence it is delivered into a sump 34 carried by the vertical stand pipe 1. A cover 35 depends from the free end of the pipe 5 around the upper end of the nozzle 20 and projects radially some distance beyond said nozzle so that when the drip pan 32 is in position under the nozzle, it will be thoroughly protected by this cover against the entrance of water, snow and the like. This cover 35 as shown is apertured as at 36 for the passage therethrough of the cords 22, and is provided with a depending hook 35' for engaging a lateral lug 21'' on the nozzle section 21' to assist in retaining the nozzle in collapsed position.

The sump 34 is secured to the vertical member 1 of the stand pipe and extends entirely around the stand pipe having a fluid tight joint where it is connected with the pipe and is positioned on said member 1 below the stuffing or packing box 6 so that all drippings from the box as well as the waste returned thereto from the pipe 28 are caught therein. This sump 34 is provided with a cover 37 which is revolubly mounted on the upper edge of the sump and on the pipe 1 as is shown clearly in Fig. 2, having an upstanding collar 37' loosely mounted on pipe 1 and over which an outwardly inclined flange 38 carried by pipe 1 extends and forms a guide for said cover and also prevents it from moving upward on pipe 1.

The drip pipe 28 has a swiveled connection with the sump cover 37 as is shown clearly in Figs. 1 and 2 to provide for its free movement both vertically and laterally. Supporting of the inner end of the drip pipe upon the revolving cover of the sump, relieves the swinging delivery pipe from much of the weight of said pipe and hence this cover performs a double function of a cover to the sump and support for said pipe.

A waste tank 39 is suitably mounted in an under ground vault 40 and is connected to the sump 34 by means of a pipe 41 having a valve 42. The waste tank 39 is connected to the vertical member 1 by means of a pipe 43 having a suitable valve 44. This pipe 43 leads from the bottom of the waste tank while the pipe 41 leads to the top thereof.

A pipe 45 leads into the top of the waste tank 39 from a suitable source of pressure not shown and is designed for a purpose to be hereinafter more fully described.

In the operation of this improved stand pipe, the revoluble delivery pipe 5 is swung into the desired position to bring the nozzle 20 thereof directly over the vehicle to be filled with oil as shown in Fig. 1, the drip pan 32 having been disengaged from the nozzle as will be understood before said nozzle can be extended and this removal of the drip pan is accomplished by depressing the waste or drip pipe 28 against the tension of the spring support 27 and swinging said pan to one side of the nozzle, the spring support 27 serving to elevate the pan in a plane above the lower end of the nozzle when collapsed. The nozzle then is lengthened by means of its telescopic sections to adapt it to be extended over the vehicle to be filled. Now assuming that the valve 19 is open, the valve 4 is opened and oil or other liquid permitted to flow through the vertical member 1 of the stand pipe, the horizontal delivery pipe 5, and thence through the nozzle 20 into the receptacle to be filled. As soon as the said receptacle has been filled, the valve 4 is closed and the nozzle 20 collapsed and the drip pan 32 immediately swung under and up against the lower end of the nozzle section 21' as shown in Fig. 3 where it is held with a liquid tight joint by means of the spring support 27. The oil remaining in the delivery pipe 5 and nozzle 20 is conducted through the waste pipe 28 into the sump 34 whence it is conducted into the waste tank 39 by means of the pipe 41. The waste tank 39 may be of a capacity to hold the waste of the stand pipe for any desired length of time, say twenty-four hours, and as soon as said tank is filled, the valve 42 in the pipe 41 is closed and the valve 44 in pipe 43 is opened. The valve 46 in pipe 45 is also opened whereby pressure is introduced into the waste tank 39 at the top thereof and expels all of the contents of said tank through the pipe 43 into the vertical member 1 of the stand pipe whereby all waste is returned to the stand pipe or into the pipe line. By connecting the inner end of the waste pipe 28 with the revoluble top 37 of the sump, said pipe is free to be revolved with the delivery pipe 5 and thus its delivery end is always in proper position to deliver the waste into the sump. As soon as the waste tank 39 has been emptied of its contents, the valves 46 and 44 are closed, and the valve 42 again opened and the stand pipe or column is again ready for use.

From the foregoing description, it will be understood that the delivery pipe 5 may be swung laterally on the upright pipe or stand 1 to position it at any desired point thereon by means of the lock provided by the catch 10 and recessed plate 17, this pipe 5 will be held at any desired adjusted position, being automatically locked on the positioning of one of the recesses 18 in the plate 17 opposite the head 13 of the locking member 10. By providing this locking means, swinging movement of the delivery pipe 5 by the wind is prevented and yet it may be readily turned by exerting sufficient pressure to cause the head 13 of the catch member 10 to ride out of the curved recess 18 with which it is engaged. When not in use, this delivery pipe 5 is designed to be arranged parallel with the track or roadway at the side of which it is mounted and will be held in this position by the interlocking of the catch 10 with the plate 17, thus preventing all possible accidents.

I claim as my invention:

1. In a stand pipe the combination of a vertical pipe, a sump mounted thereon, a horizontal delivery pipe revolubly mounted on said vertical pipe, a cover for said sump revolubly mounted on said vertical pipe, a drip pan adapted to close the end of the delivery pipe, and a waste pipe connected to said pan and leading into said sump through the cover thereof, said pipe being supported partly by said cover and partly by said delivery pipe to adapt it to move around the vertical pipe over said sump on the turning of said delivery pipe.

2. In a stand pipe the combination of a vertical pipe, a sump secured around said vertical pipe, a cover for said sump revolubly mounted on said vertical pipe, a horizontal delivery pipe revolubly mounted on said vertical pipe, a drip pan adapted to extend under the end of said delivery pipe, a waste pipe connected with said pan and with the cover of said sump opening through said cover and discharging into said sump, said waste pipe having one end supported by said delivery pipe and its other end supported by and having a swiveled connection with said cover.

3. The combination of a stand pipe, a sump mounted thereon, a delivery pipe revolubly mounted on said stand pipe, a cover for said sump having an upstanding collar loosely engaging said stand pipe for revoluble engagement therewith, a flange on said stand pipe extending over and engaging said collar to form a guide for said cover and to prevent its vertical movement on said pipe, a waste pipe opening through said cover at one end and having a drip pan at its other end adapted to be disposed under the discharge end of the delivery pipe.

In testimony whereof I have hereunto set my hand in presence of two subscribing witnesses.

WESLEY M. ROSE.

Witnesses:
 FRANK J. O'BRIEN,
 PAULINE JOHNSTON.

Copies of this patent may be obtained for five cents each, by addressing the "Commissioner of Patents, Washington, D. C."